United States Patent
Archer (10) Patent No.: US 12,259,509 B2
(45) Date of Patent: Mar. 25, 2025

(54) GEOPHYSICAL DATA ACQUISITION SYSTEM AND METHOD OF ACQUISITION OF GEOPHYSICAL DATA

(71) Applicant: John Archer, Lagoa (PT)

(72) Inventor: John Archer, Lagoa (PT)

(*) Notice: Subject to any disclaimer, the term of this patent is extended or adjusted under 35 U.S.C. 154(b) by 473 days.

(21) Appl. No.: 17/902,939

(22) Filed: Sep. 5, 2022

(65) Prior Publication Data
US 2024/0077628 A1 Mar. 7, 2024

(51) Int. Cl.
*G01V 1/09* (2006.01)
*G01V 1/104* (2006.01)
*G01V 1/13* (2006.01)

(52) U.S. Cl.
CPC .............. *G01V 1/09* (2013.01); *G01V 1/104* (2013.01); *G01V 1/13* (2013.01)

(58) Field of Classification Search
CPC .............. G01V 1/09; G01V 1/104; G01V 1/13
See application file for complete search history.

(56) References Cited

U.S. PATENT DOCUMENTS

| | | | | |
|---|---|---|---|---|
| 7,813,224 B2* | 10/2010 | Krumhansl | ............ | G01V 1/047 367/189 |
| 8,804,463 B2* | 8/2014 | Krumhansl | ............ | G01V 1/147 367/87 |
| 2007/0235250 A1* | 10/2007 | Krumhansl | ............ | G01V 1/047 181/121 |
| 2024/0077628 A1* | 3/2024 | Archer | ................... | G01V 1/104 |

FOREIGN PATENT DOCUMENTS

GB 2511420 A * 9/2014 ............ A01G 17/16

* cited by examiner

*Primary Examiner* — Daniel Pihulic
(74) *Attorney, Agent, or Firm* — Jose Cherson Weissbrot (57) ABSTRACT

Disclosed is a geophysical data acquisition system. The system comprises a frame assembly; a set of ground engaging members connected to the frame assembly, and adapted to move the frame assembly along the ground surface; and a carrier assembly carried by the frame assembly, the carrier assembly having one or more seismic source subsystems and a drive mechanism adapted to move each of the one or more seismic source subsystems through a plurality of positions between a lowered position and a raised position and forward and rearward positions with respect to the frame assembly. The movement of each of the one or more seismic source subsystems being in coordination with the movement of the frame assembly, such that each of the one or more seismic source subsystems move to the lowered position when the frame assembly approaches one or more data acquisition points on the ground surface.

20 Claims, 8 Drawing Sheets

GEOPHYSICAL DATA ACQUISITION SYSTEM AND METHOD OF ACQUISITION OF GEOPHYSICAL DATA

FIELD OF THE INVENTION

The present invention generally relates to geophysical data acquisition systems, and, more particularly, to a seismic data acquisition system and a method of acquisition of seismic data on land.

BACKGROUND OF THE INVENTION

Geophysical surveys are the systematic collection of geophysical data for spatial studies. One way to carry out geophysical surveys is through seismic exploration. Seismic exploration refers to the use of seismic energy to probe beneath the surface of the earth. It generally utilizes a seismic energy source to generate an acoustic signal that propagates into the earth and is partially reflected by subsurface seismic reflectors (i.e., interfaces between subsurface lithologic or fluid layers characterized by different elastic properties). The reflected signals (known as "seismic reflections") are detected and recorded by seismic receivers located at or near the surface of the earth, thereby generating a seismic survey of the subsurface. The recorded signals, or seismic energy data, can then be processed to yield information relating to the lithologic subsurface formations, identifying such features, as, for example, lithologic subsurface formation boundaries.

Often the seismic exploration is carried out using a vehicle-mounted "impulsive" seismic energy source. The impulsive seismic energy source is a source that imparts substantially all its energy into the subsurface in a single, short-duration event. The vehicle carrying the source typically navigates to a predetermined source location, lowers the baseplate of the source to the ground, increases the hold-down pressure upon the baseplate to ensure good coupling of the seismic source to the ground surface, prepares the potential energy of the seismic source and sends a "Ready" signal to the seismic recorder or other device controlling the acquisition. The recorder or other controlling device then sends a "Start" signal to the waiting seismic source which then releases the potential energy creating the seismic "shot". The source vehicle then remains stationary for a short period of time known as the "listen time" or may raise the seismic source and move ahead.

The initiation of seismic shots may be repeated a number of times at the same location until a desired seismic data quality is achieved. In this case, steps from preparing the potential energy of the seismic source to recording the desired seismic data are repeated. Once the desired data quality is achieved, the source vehicle will unload the hold-down pressure previously applied to the baseplate, raise the baseplate from the ground to a sufficient height to avoid it snagging on obstacles, and navigate to the next desired source location.

The time required to complete the various steps mentioned above, can typically range from about 30 seconds to many minutes and can be affected by many factors such as the length of the "listen time", the time to lower, load, unload and raise the baseplate, the time required to prepare the potential energy for each "shot", the number of shots required at each source location, the distance between subsequent source locations and the achievable forward speed of the vehicle carrying the seismic source.

On the other hand, it is well known that increasing the number of source locations in a seismic survey can improve the quality of the resulting seismic data and decreasing the time required to obtain those shots results in improved operational and financial efficiency.

SUMMARY OF THE INVENTION

In view of the foregoing disadvantages inherent in the prior art, the general purpose of the present invention is to provide a geophysical data acquisition system to include all advantages of the prior art, and to overcome the drawbacks inherent in the prior art.

An object of the present invention is to improve geophysical data acquisition, by providing a system that ensures a quick, efficient, and reliable geophysical data acquisition system.

Another object of the present invention is to preclude a need to interrupt forward movement of a seismic source vehicle in order to impart the seismic energy, thereby increasing the speed of geophysical data acquisition.

Yet another object of the present invention is to utilize time between two consecutive readings by preparing the seismic source for the next shot.

Yet another object of the present invention is to increase the number of source locations that can be acquired in a certain period of time.

To achieve the above objects, in an aspect of the present invention, a geophysical data acquisition system is provided. The geophysical data acquisition system comprises a frame assembly; a set of ground engaging members connected to the frame assembly, and adapted to move the frame assembly along the ground surface; and a carrier assembly attached to the frame assembly, the carrier assembly having one or more seismic sources having seismic source baseplates, and a drive mechanism adapted to move each of the one or more seismic source baseplates through a plurality of positions between a lowered position and a raised position, and a forward position and a rearward position with respect to the frame assembly. The movement of the baseplate of each of the one or more seismic sources being in coordination with the movement of the frame assembly, such that the baseplate of each of the one or more seismic sources move to the forward, lowered position when the frame assembly approaches one or more data acquisition points on the ground surface, whereby the movement of the frame assembly is maintained while the baseplate of each of the one or more seismic sources remain stationary with respect to the data acquisition point on the ground surface.

By controlling and coordinating the movement of the one or more seismic sources with respect to the frame assembly and the movement of the frame assembly on the ground surface, the geophysical data acquisition system of the present disclosure facilitates improved utilization of time.

Further, by moving the seismic sources to the lowered position when the frame assembly approaches one or more data acquisition points on the ground surface, and by maintaining the forward movement of the frame assembly along the ground surface while keeping the seismic sources stationary with respect to the data acquisition point on the ground surface, the geophysical data acquisition system eliminates the need to interrupt forward motion of the frame assembly while actuating the seismic sources.

In another aspect of the disclosure a method of acquiring geophysical data is provided. The method comprises operating a set of ground engaging members to move a frame assembly and a carrier assembly attached to the frame member, along a ground surface; operating the drive mechanism to move a seismic source through a plurality of positions between a lowered position and a raised position, a forward position and a rearward position, with respect to the frame assembly; and coordinating the movement of the set of ground engaging members and the drive mechanism such that the seismic source moves to the lowered position when the frame assembly approaches one or more data acquisition points on the ground surface.

By coordinating the movement of the set of ground engaging members and the drive mechanism such that the seismic source moves to the lowered position when the frame assembly approaches one or more data acquisition points on the ground surface, the disclosed method facilitates improved utilization of time between one or more data acquisition points.

Further, by controlling the movement such that a horizontal relative movement of the seismic source baseplate with respect to the data acquisition point on the ground surface is substantially zero at the moment of actuation of the seismic source, the disclosed method eliminates the need to keep the frame assembly stationary while taking a reading.

In yet another aspect of the present disclosure, a system for acquiring seismic data is provided. The system comprises a frame assembly; a set of ground engaging members connected to the frame assembly for supporting the frame assembly on a ground surface, the set of ground engaging members being adapted to rotate to enable movement of the frame assembly along a horizontal direction on the ground surface; and a carrier assembly attached to the frame member, the carrier assembly having a seismic source movably connected to a drive mechanism, the drive mechanism adapted to move the seismic source with respect to the frame member, through a plurality of positions between a lowered position and a raised position, along a vertical direction, the seismic source having a baseplate. The movement of the baseplate along the horizontal direction while in the lowered position is in coordination with and opposite to the movement of the set of ground engaging members along the horizontal direction, such that a net horizontal movement of the seismic source with respect to the ground surface is substantially zero. Further, in the lowered position, the baseplate of the seismic source is in contact with a data acquisition point on the ground surface to apply a quantity of pressure thereon. The seismic source is adapted to be operated when the seismic source is in contact with the data acquisition point.

This together with the other aspects of the present invention, along with the various features of novelty that characterize the present invention, is pointed out with particularity in the claims annexed hereto and forms a part of the present invention. For a better understanding of the present invention, its operating advantages, and the specified object attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE INVENTION

For a thorough understanding of the present invention, reference is to be made to the following detailed description, including the appended claims, in connection with the above-described drawings. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The terms, "a" and "an" herein do not denote a limitation of quantity, but rather denote the presence of at least one of the referenced item.

The present invention provides a geophysical data acquisition system and method of acquisition of geophysical data. The system controls and coordinates the movement of one or more of seismic sources with respect to the frame assembly and the movement of the frame assembly on the ground surface, and accordingly the geophysical data acquisition system of the present disclosure facilitates improved utilization of time. Further, the system moves the seismic sources to the lowered position when the frame assembly approaches one or more data acquisition points on the ground surface and allows the movement of the frame assembly while keeping the seismic sources stationary with respect to the data acquisition point on the ground surface. Accordingly, the geophysical data acquisition system eliminates the need to keep the frame assembly stationary while taking measurements.

Figure 1:
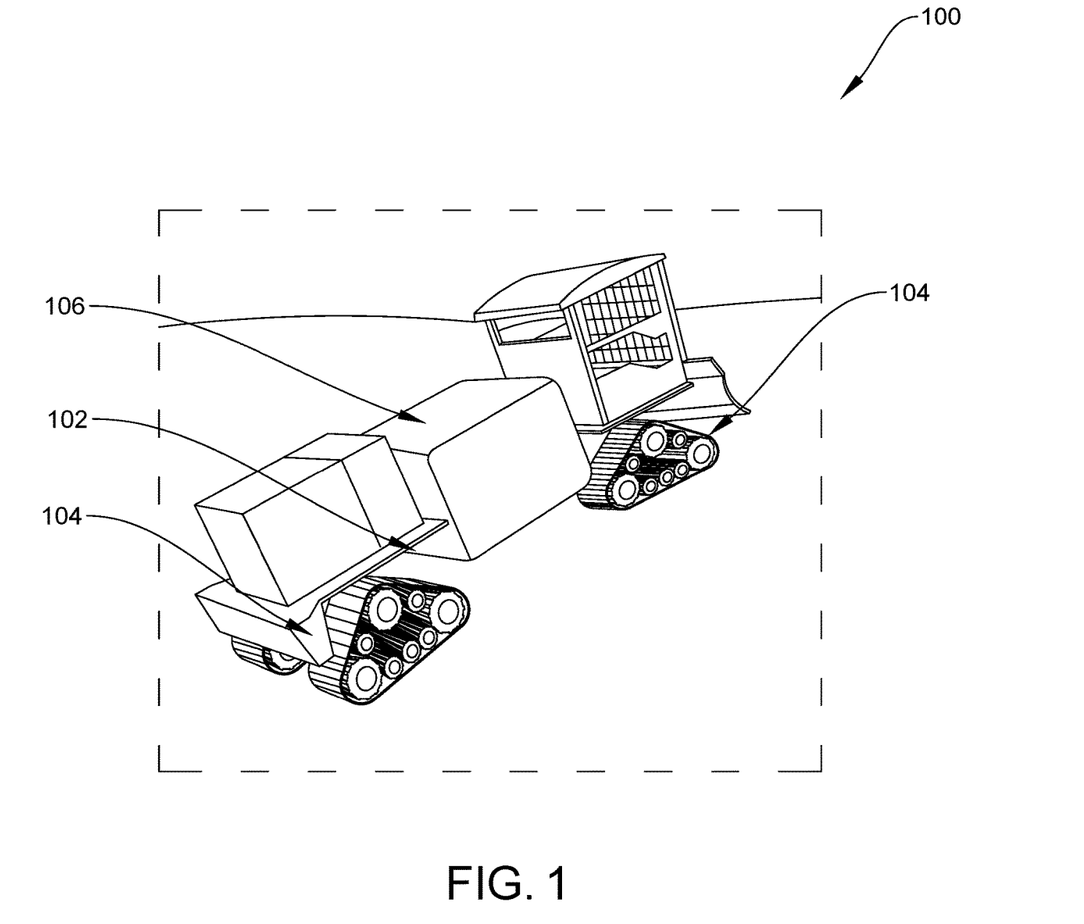
FIG. 1 illustrates a perspective view of a geophysical data acquisition system, in accordance with an embodiment of the present invention.

Referring now to FIG. 1, a perspective view of a geophysical data acquisition system 100 is illustrated, in accordance with an embodiment of the present invention. As would be understood to those skilled in the art the geophysical data may include seismic data.

The geophysical data acquisition system 100, also interchangeably referred to as system 100, includes a frame assembly 102 and a set of ground engaging members 104. In an example, the frame assembly 102 can be understood as a frame, or chassis of the system 100, that carries various elements of the system 100 or to which various elements of the system 100 are connected. The set of ground engaging members 104 support the frame assembly 102 on a ground surface. In an embodiment, the set of ground engaging members 104 may be wheels. In other embodiments, the set of ground engaging members 104 may be tracks, or a combination of tracks and wheels. The set of ground engaging members 104 are connected to the frame assembly 102. Specifically, the set of ground engaging members 104 are connected to the frame assembly 102 such that movement of the set of ground engaging members 104 enables movement of the frame assembly 102 along a horizontal direction on the ground surface.

It may herein be noted that the movement of the set of ground engaging members 104 may be powered by a power unit (not illustrated) which may be an internal combustion engine, or one or more electric motors. Further, the set of ground engaging members 104, in addition to being directly connected to the frame assembly 102, may also be connected to a separate vehicle connected to and propelling, the frame assembly 102.

Further, the movement of the set of ground engaging members 104, whether it is powered by an internal combustion engine, or one or more electric motors, can be precisely controlled. On the other hand, maneuvering and steering of the set of ground engaging members 104 may be autonomously, semi-autonomously or manually controlled.

In an embodiment, rotation of the set of ground engaging members 104 in a first rotational direction (e.g., clockwise direction) causes forward movement of the frame assembly 102. On the other hand, rotation of the set of ground engaging members 104 in a second rotational direction (e.g., anti-clockwise direction) causes rearward movement of the frame assembly 102.

The geophysical data acquisition system 100 further includes a carrier assembly 106. The carrier assembly 106 is attached to the frame assembly 102. In an embodiment, the carrier assembly 106 is removably connected to the frame assembly 102. Since the carrier assembly 106 is connected to the frame assembly 102, the carrier assembly 106 also moves as a whole, along with the frame assembly 102, with the movement thereof. In other words, when the frame assembly 102 moves in a forward direction, the carrier assembly 106 also moves with frame assembly 102, in the forward direction. Likewise, when the frame assembly 102 moves in a rearward direction, the carrier assembly 106 also moves with frame assembly 102, in the rearward direction.

Figure 2:
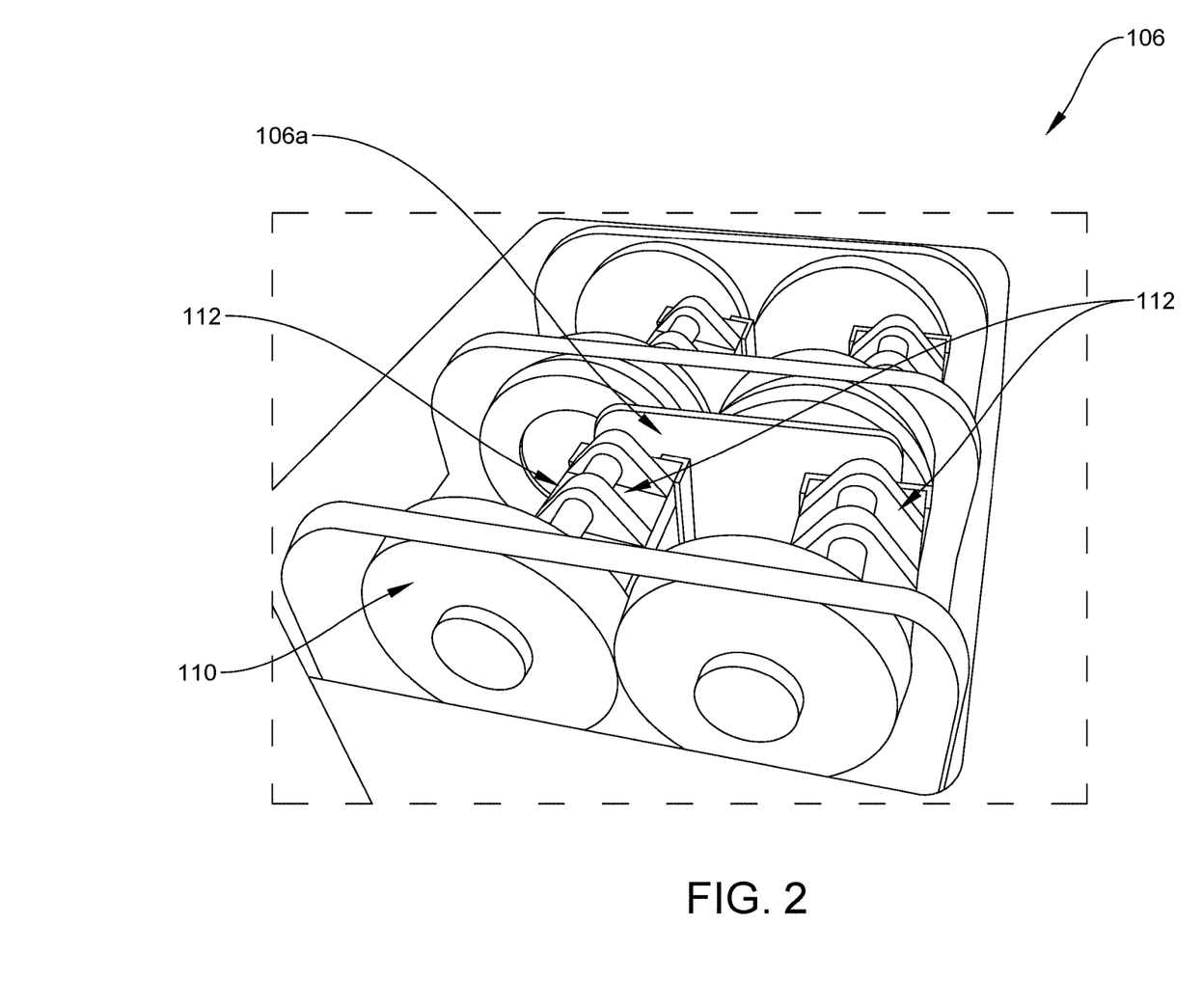
FIG. 2 illustrates a perspective view of a portion of a carrier assembly of the geophysical data acquisition system of FIG. 1, in accordance with an embodiment of the present invention.
Figure 2A:
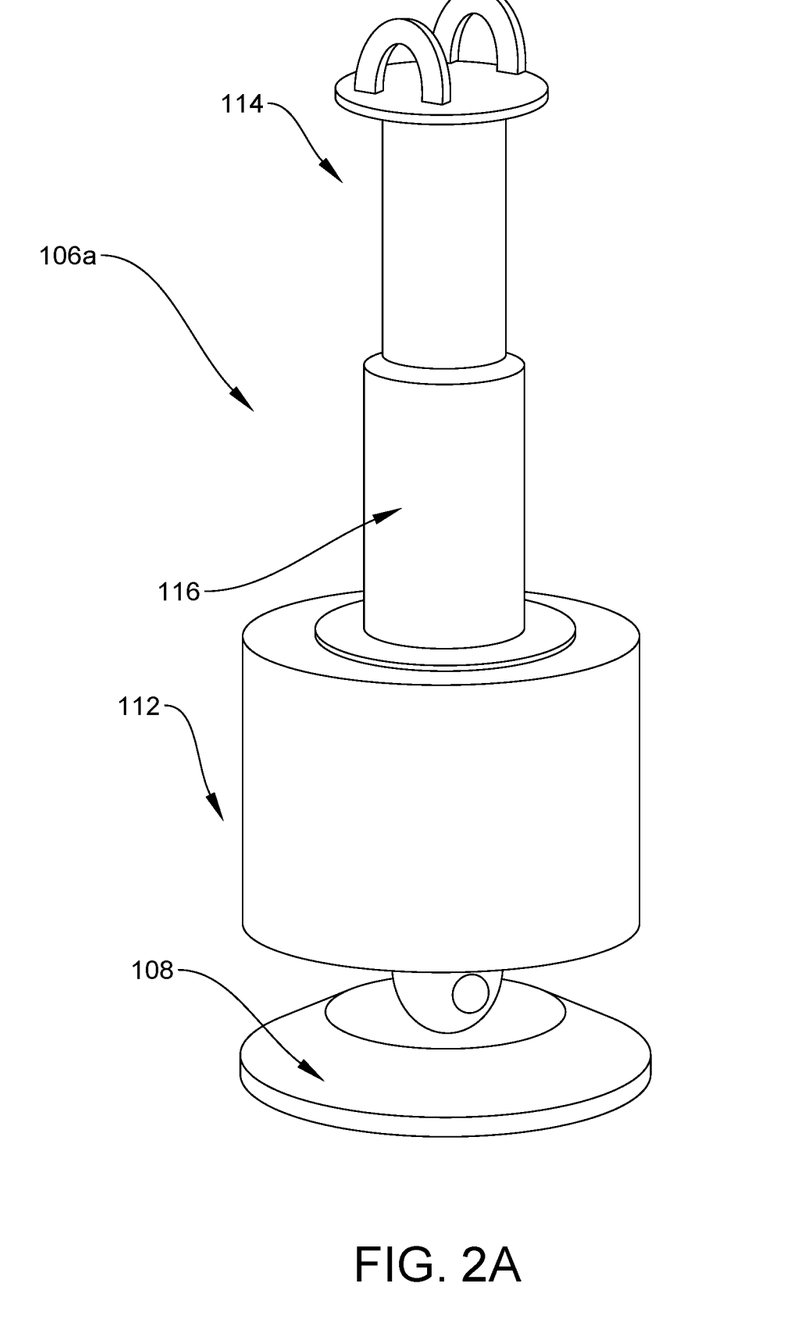
FIG. 2A illustrates a perspective view of a seismic source system, in accordance with an embodiment of the present invention.

As shown in FIGS. 2, and 2A, the carrier assembly 106 includes a seismic source system 106a, and a drive mechanism 110. The seismic source system 106a includes a seismic source 112 (also interchangeably referred to as seismic source subsystem), an attachment part 114, a holddown force control mechanism 116, and a baseplate 108. In an example, the seismic source 112 may be embodied as a seismic impulsive firing mechanism using detonation of an air/propellant mixture as described in US Patent No. US2016/0216387A1. Different impulsive seismic source 112 may be deployed with different operating characteristics, and different firing pulse shapes and durations such as to generate seismic waves of preferentially different frequencies and amplitudes.

In an embodiment, the carrier assembly 106 includes a plurality of seismic source systems 106a. In an example, as illustrated in FIG. 2, the plurality includes four seismic source systems. In other embodiment, there may be fewer or more seismic source systems.

The seismic source system 106a, is movably connected to the drive mechanism 110, using the attachment part 114. The drive mechanism 110 is adapted to move the one or more seismic sources 112 with respect to the frame member 102. In an example, the one or more seismic sources 112 may be movably connected to the drive mechanism 110 such that the one or more seismic sources 112 remains in a ground facing orientation during each of the plurality of positions thereof, between the lowered position and the raised position. In another example, one or more seismic sources 112 obtain the ground facing orientation, as they approach the lowered position. In other embodiments the one or more seismic sources 112 may be at a fixed angular orientation with respect to the ground. The seismic sources deployed at angles off vertical allow for generation of seismic shear waves. Such deviations off vertical may be in a fore-aft and/or left-right paired orientation. The deployment at angles off vertical may utilize firing in dipole type patterns. Said seismic sources may include any of various mechanical surface modifications to the baseplate 108 to enhance the horizontal shear coupling to the earth, including, but not limited to spikes, ridges, or corrugations. In an embodiment some seismic sources 112 may be deployed vertically, but adjacent seismic sources 112 may be fired in paired time delayed dipole patterns to allow for generation of seismic shear waves.

The movement of the seismic sources 112 along a vertical direction with respect to the frame member 102 is through a plurality of positions between a lowered position and a raised position. As such, in the lowered position the seismic sources 112 are positioned in contact with the ground surface, whereas in the raised position the seismic sources 112 move up from the ground surface or are not in contact with the ground surface. Therefore, in each of the plurality of positions between the lowered position and the raised position, the seismic source 112 can have a different distance from a ground surface. The movement of the seismic sources 112 in the horizontal plane of travel of the frame member 102 is through a plurality of positions between a forward position and a rearward position. More specifically, the baseplates 108 of the seismic sources 112 move forwards in the raised position, and rearwards in the lowered position. In an example, the seismic source 112 moves in a rotational direction combining vertical and horizontal movement with respect to a reference point on the frame member 102.

In an embodiment, where there are multiple seismic sources 112, the drive mechanism 110 may be adapted to move each of the multiple seismic sources 112, such that each of the multiple seismic sources 112 have a same distance from the ground surface. In an alternative embodiment, where there are multiple seismic sources 112, the drive mechanism 110 may be adapted to individually moves each of the multiple seismic sources 112, such that each of the multiple seismic sources 112 have a different distance from ground surface.

The movement of each of the one or more seismic sources 112 is in coordination with the movement of the frame assembly 102. More particularly, the movement of the seismic sources 112 with respect to the frame assembly 102, is coordinated with movement of the frame assembly 102 along the ground surface. For example, if the frame assembly 102 moves on the ground surface by a unit linear distance, the seismic sources 112 move by a predetermined angular movement with respect to the frame assembly 102.

Now, since the seismic sources 112 are carried by the frame assembly 102 and move in coordination with movement thereof, each of the one or more seismic sources 112 move to the lowered position when the frame assembly 102 approaches one or more data acquisition points on the ground surface. As the baseplates 108 move to the lowered position their horizontal movement is momentarily equal and opposite in direction to the movement of the frame assembly 102, such that the forward movement of the frame assembly 102 is maintained while the seismic source baseplates 108 remain horizontally stationary with reference to the data acquisition point on the ground surface. While the baseplates 108 are in contact with the ground surface, the seismic sources 112 are actuated.

In such a position, i.e., the lowered position, the baseplate 108 of the seismic source 112 is, or the baseplates 108 of the seismic sources 112 are, in contact with the data acquisition point on the ground surface. In addition to being in contact the seismic source baseplate 108 applies a pressure on the ground surface. In an example, the pressure applied is of a predetermined quantity. The pressure may be referred to as a hold-down pressure, and ensures good coupling of the seismic source to the ground. The quantity of pressure applied by each of the seismic source baseplates 108 on the data acquisition point on the ground surface may vary based on various factors, including, but not limited to, type of soil on the ground, the density of soil on the ground, type of seismic source, the strength of the seismic source, etc.

In an example, when the seismic source 112 is in the lowered position, i.e., the baseplate 108 in contact with the data acquisition point on the ground surface, the entire weight of the geophysical data acquisition system 100, including the carrier assembly and the frame assembly 102, or a desired percentage of the weight (the hold-down force), is passed on to the ground through the baseplate 108.

In an embodiment, the hold-down force applied to the seismic source baseplate 108 on the data acquisition point is equal to or greater than a recoil force generated on the actuation of the seismic sources. Therefore, a likelihood of the seismic source 112 rebounding upon actuation is precluded. Accordingly, the seismic source baseplate 108 remains in pressurized contact with the ground surface when actuated.

In an embodiment of the present disclosure, the geophysical data acquisition system 100 further includes a control unit 120 in communication with the carrier assembly 106. The control unit 120 may be positioned on the frame assembly 102, carrier assembly 106, or elsewhere in the system 100, and the illustrated position of the control unit 120 shall not be considered to be a limiting example. In an embodiment, the control unit 120 is in communication with each of the carrier assembly 106, and the set of ground engaging members 104. Owing to such communication between the control unit 120, and each of the carrier assembly 106, and the set of ground engaging members 104, the control unit 120 is adapted to control the movement of one or more of the drive mechanism 110 of the carrier assembly 106, and the set of ground engaging member 104. In an example, the control unit 120 is adapted to control the movement of one or more of the drive mechanism 110 of the carrier assembly 106, and the set of ground engaging member 104. In another example, the control unit 120 is adapted to control the movement of each of the drive mechanism 110 of the carrier assembly 106, and the set of ground engaging member 104. The communication between the control unit 120 and various other components of the geophysical data acquisition system 100 may be using Controller Area Network (CAN bus), or through any other known in-vehicle communication protocol.

The control unit 120 is adapted to store location and time of actuation associated with each seismic source. In various embodiment, the control unit 120 is also adapted to store other data including but not limited to a map data for a geographical area, identification information pertaining to a plurality of data acquisition points on the geographical area, and navigation information through the plurality of data acquisition points. In order to have data processing, data storage, and command execution capabilities, the control unit 120 may have a same or similar hardware configuration as a conventional computer or an ECU.

The control unit 120 is adapted to control the movement of one or more of the ground engaging members 104 and the drive mechanism 110, such that the horizontal movement of the seismic source baseplate 108 with respect to the upcoming data acquisition point during contact of the seismic source 112 with the ground is zero. The control unit 120 can control the movement of either the ground engaging members 104 or the drive mechanism 110, or both. By controlling such movement, the control unit 120 ensures that the horizontal movement of the seismic source 112 with respect to the upcoming data acquisition point during contact of the seismic source 112 with the ground is zero. In an embodiment, the control unit 120 is adapted to control the movement of one or more of the ground engaging members 104 and the carrier assembly, such that during rotation of the ground engaging members 104 in a clockwise direction, the drive mechanism 110 is adapted to rotate the seismic source 112 around also in a clockwise direction whereby the horizontal movement of the seismic source 112 with respect to an upcoming data acquisition point is zero when in the fully lowered position. In another embodiment, the control unit 120 is adapted to control the movement of one or more of the ground engaging members 104 and the carrier assembly such that during the movement of the frame assembly 102 in forward direction, at a location proximal to a data acquisition point, the drive mechanism 110 is adapted to move the seismic source 112 in direction opposite to forward direction at a velocity equal and opposite to that of the frame assembly 102, whereby the horizontal movement of the seismic source baseplate 108 with respect to the data acquisition point is zero.

At such an instance, i.e., when the seismic source 112 is in contact with a data acquisition point, the control unit 120 initiates the seismic source. Subsequently or simultaneously, the control unit 120 stores information pertaining to one or more of timing, force, and accelerometer data corresponding to the data acquisition point. In fact, the control unit 120 stores information pertaining to one or more of timing, force, and accelerometer data corresponding to each of the data acquisition points, after or when the seismic source 112 is initiated at that data acquisition point.

Further, the control unit 120 is also adapted to control the movement of each of the ground engaging members 104 and the carrier assembly, such that the seismic source 112 is in a position other than the lowered position during movement of the frame assembly 102 between one data acquisition point to subsequent data acquisition point. This precludes any possibility of the carrier assembly interfering with ground obstacles. Thus, when the seismic source 112 has been actuated at one data acquisition point, and there is a need to move the system 100 to a subsequent data acquisition point, the control unit 120 controls the movement of each of the ground engaging members 104 and the carrier assembly, such that the seismic source 112 moves to a position other than the lowered position during movement of the frame assembly 102 between one data acquisition point to subsequent data acquisition point.

The control unit 120 may also be used to ensure safe operation and may stop the system 100 and/or seismic source 112 motion in the event of excessive tilt or other anomalous condition deviating from the normal operation.

In such a position, i.e., in a position other than the lowered position, the control unit 120 prepares the seismic source 112 for an upcoming data acquisition point. In an embodiment, the speed at which the seismic source 112 is prepared for the next data acquisition point depends upon the distance of the next data acquisition point, the speed of the ground engaging members 104, details pertaining to all of which is already stored in, or is accessible to, the control unit 120.

The system 100 may further include scanning mechanism (not illustrated) mounted ahead of the drive mechanism and assembly for scanning the ground for obstacles or unsuitable data acquisition point locations, and delaying or advancing the downward motion of the seismic source as required to avoid them. Alternatively, or additionally, the scanner could determine the exact ground clearance, and adjust the hold-down mechanism in order to provide a consistent hold-down force. The scanning mechanism may be a laser scanner or vehicle LiDAR or radar system, or other depth-sensing mechanism.

Figure 3:
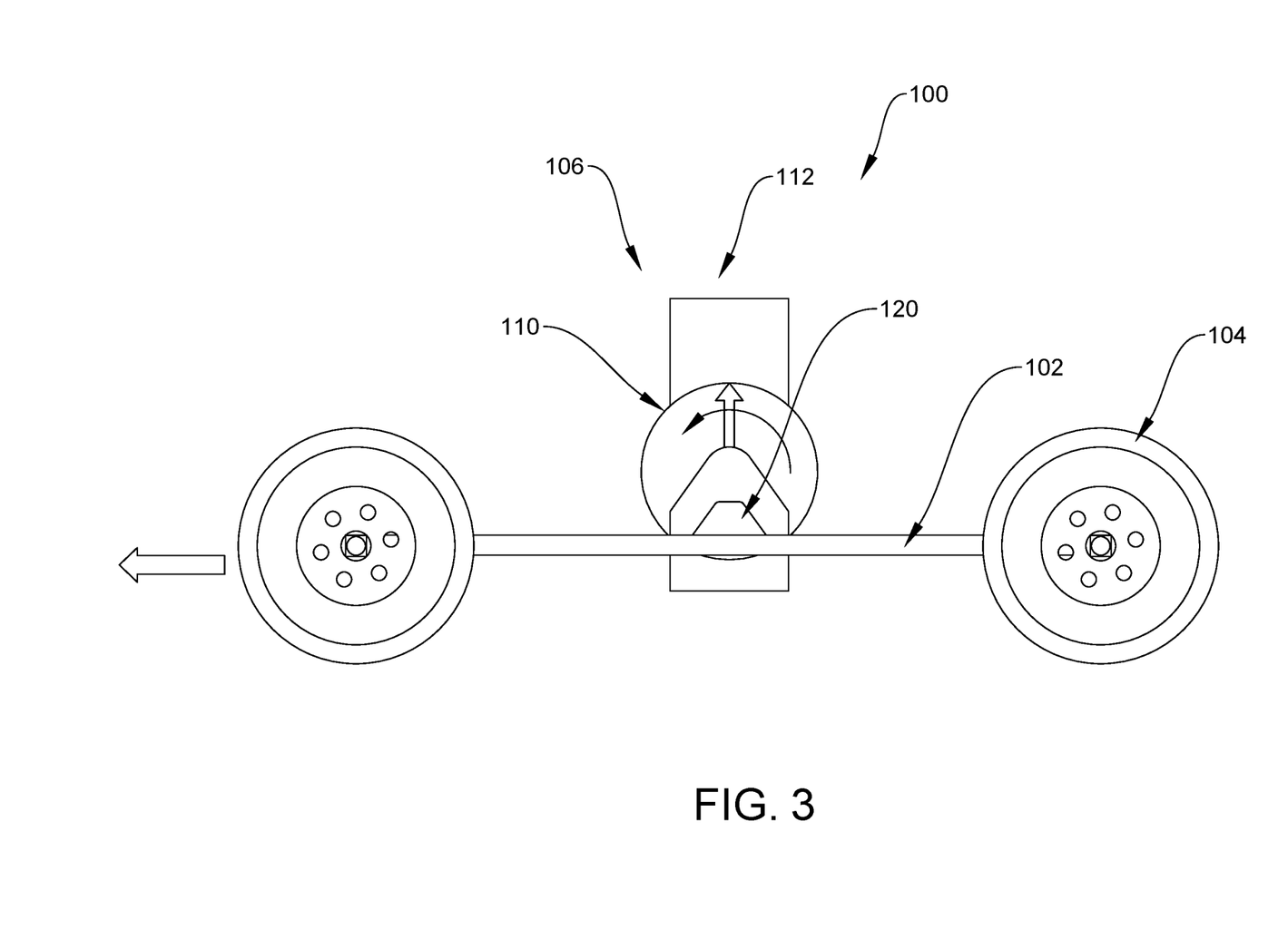
FIG. 3 illustrates a side view of the geophysical data acquisition system, in accordance with an embodiment of the present invention.

During utilization of the geophysical data acquisition system 100, the control unit 120 is equipped with or has access to, location information (e.g., map), coordinates on data acquisition points on the map, navigation information for maneuvering between the multiple data acquisition points, and current coordinates of the system 100 at any instant. Initially, the one or more seismic sources 112 may be in any position other than lowered position, for example in a position illustrated in FIG. 3. At this instant, the system 100 may be, for example, at a predetermined distance from first of the plurality of data acquisition points. The control unit 120 operates the one or more ground engaging members 104 to move the system 100 from its current location towards the first data acquisition point on the map. In another example, the control unit 120 monitors the velocity of the one or more ground engaging members 104, and distance to the data acquisition point. During such period, the control unit 120 also moves the carrier assembly. More specifically, during such movement, the control unit 120 also moves the one or more seismic sources 112, from the position illustrated in FIG. 3, to a position illustrated in FIG. 4.

Figure 4:
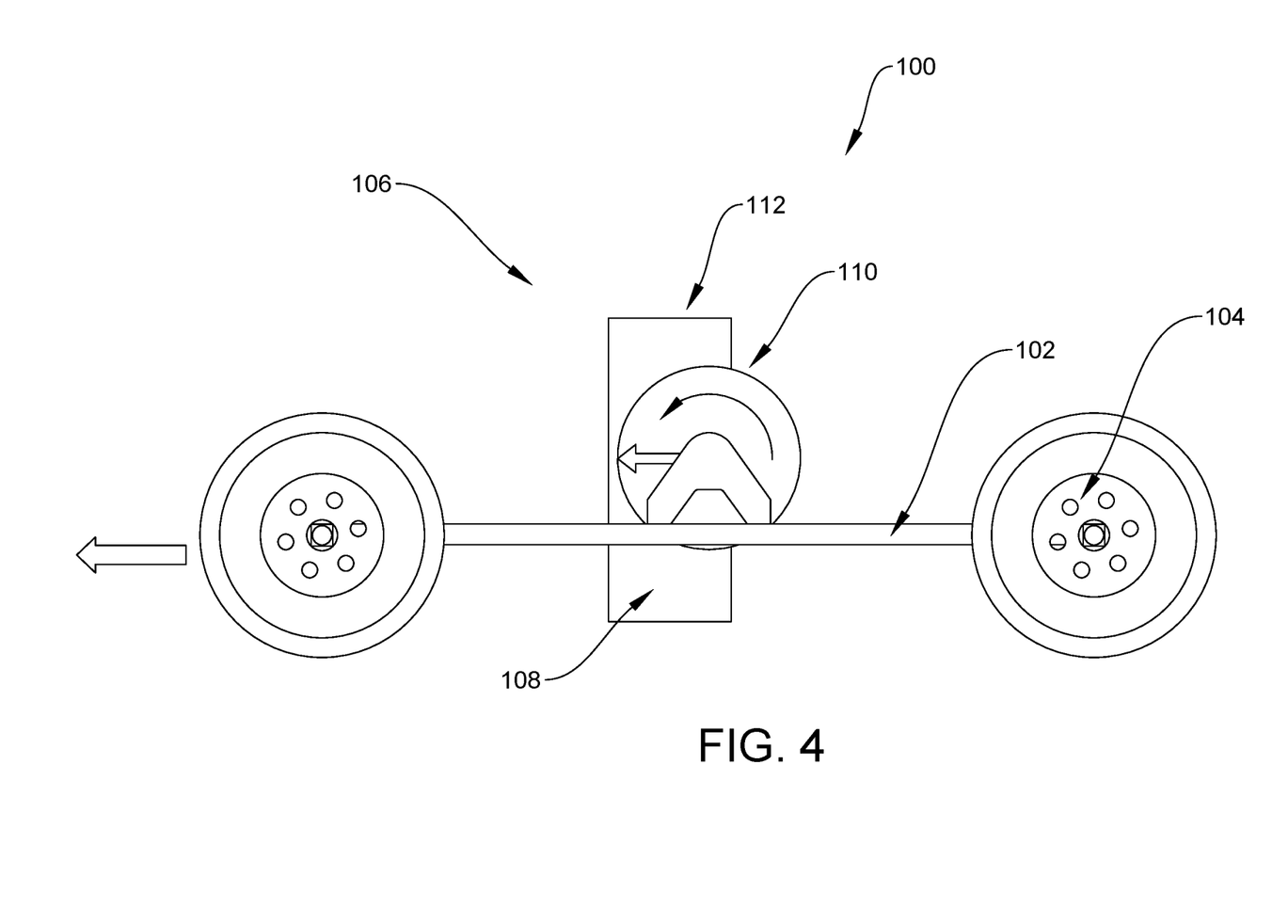
FIG. 4 illustrates another side view of the geophysical data acquisition system, in accordance with an embodiment of the present invention.

Also, during such time, the seismic sources 112 are prepared. Preparing the seismic source, as mentioned herein, may mean charging the seismic source 112 with potential energy for a discharge of seismic energy/waves, at the upcoming (first, for example,) data acquisition point.

By precluding the need to interrupt forward movement of a seismic source vehicle in order to impart the seismic energy the present disclosures save time.

Further by preparing the seismic source during and before approach thereof at the upcoming data acquisition point, the system 100 of the present disclosures saves time, and therefore makes entire process more efficient.

Moreover, the present disclosure, by saving time in data acquisition allows more data points can be acquired along the line of travel of the frame assembly, thereby further improving the overall quality of the seismic data by increasing the number of unique data acquisition locations while still saving time.

Figure 5:
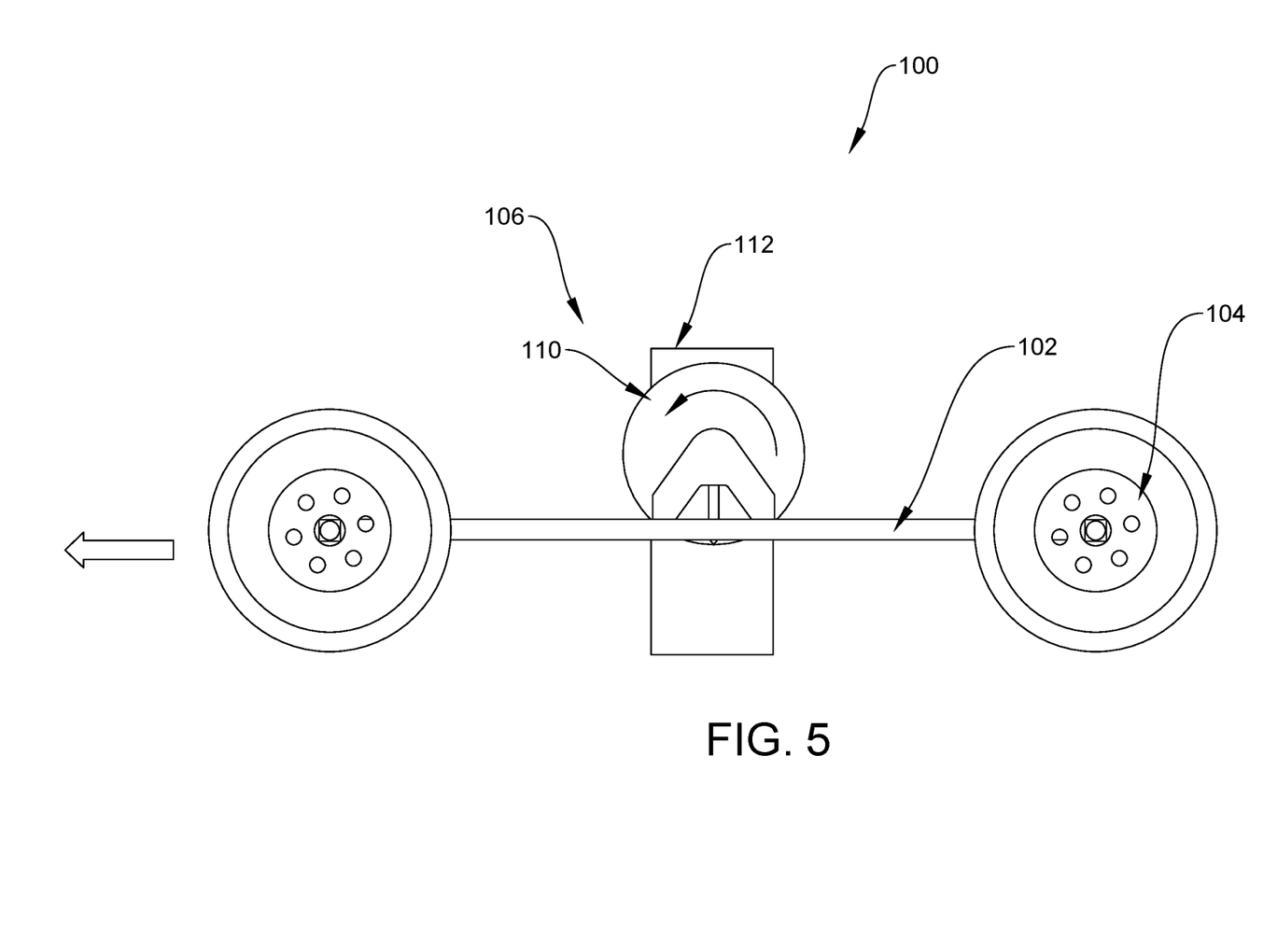
FIG. 5 illustrates another side view of the geophysical data acquisition system, in accordance with an embodiment of the present invention.

Subsequently, as the system 100 reaches the data acquisition point, as illustrated in FIG. 5, the movement of either the ground engaging members 104 or the carrier assembly, or both, is controlled in a coordinated manner. Owing to such control of movement of either the ground engaging members 104 or the carrier assembly, or both, the forward horizontal motion of the frame assembly 102 is canceled out by an equal and opposite horizontal motion of the baseplates 108 of the seismic sources 112, such that the baseplates 108 remain momentarily horizontally stationary with respect to the data acquisition point on the ground surface, and the resulting motion of the seismic sources subsystem with respect to the data acquisition point on the ground is purely in the vertical plane. For example, when the frame assembly 102 is being moved in a forward direction from point a to point b (point b being a data acquisition point), the seismic source 112 is moved with respect to the frame assembly 102, such that the seismic source baseplate 108 has zero relative horizontal movement with respect to the point b. Also at the point b, when the seismic source baseplate 108 is in contact with the data acquisition point on the ground surface applying a hold-down pressure thereon, the seismic source 112 is initiated.

Figure 6:
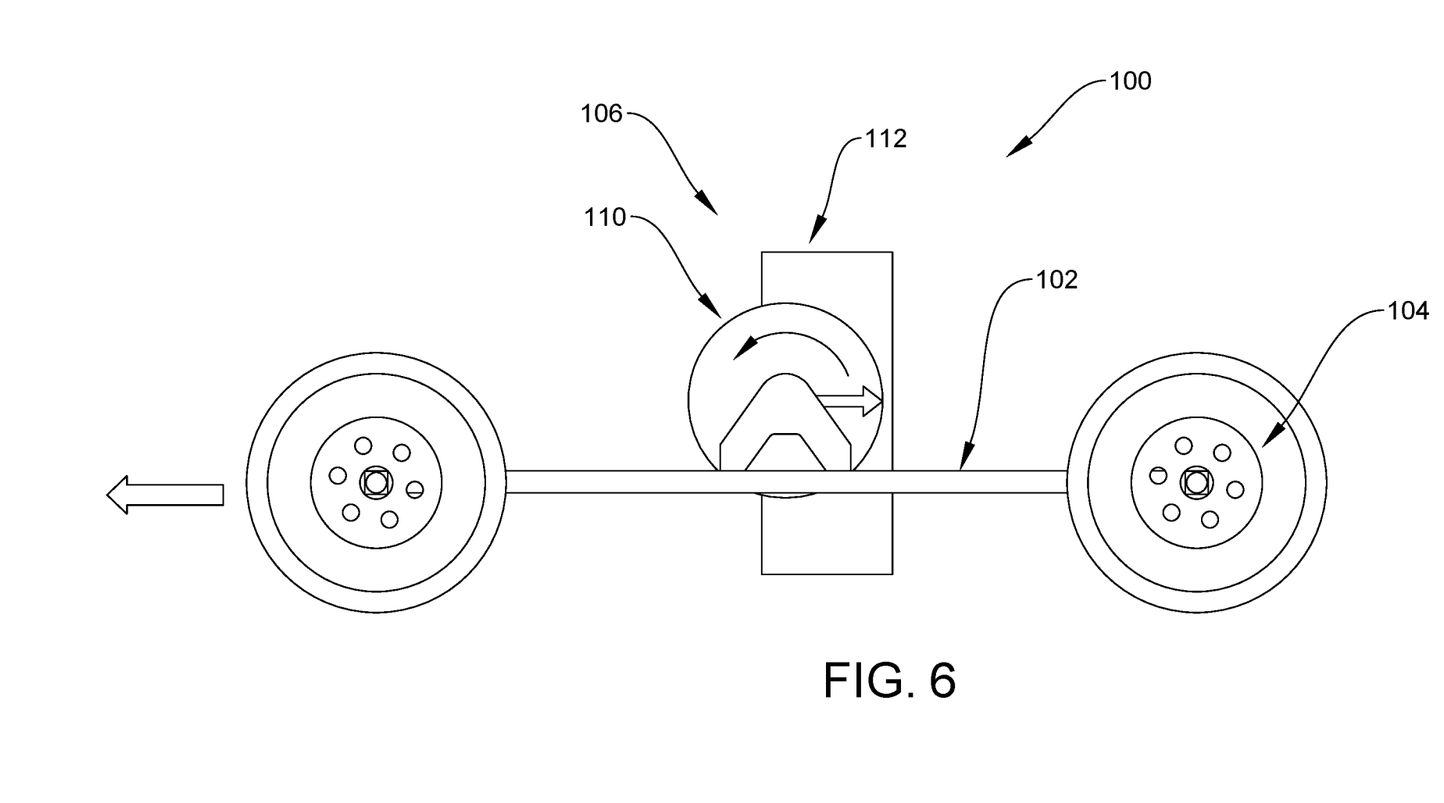
FIG. 6 illustrates another side view of the geophysical data acquisition system.

Simultaneously, the location information, time of actuation associated with each seismic source 112 is stored. In an example, the control unit 120 stores the location and time of actuation associated with each seismic source. The control unit 120 may also store data such as force applied, and accelerometer data corresponding to each data acquisition point Once the seismic source 112 is initiated, and various information and data mentioned above are recorded, the control unit 120 controls the movement of one or more of the ground engaging members 104 and the carrier assembly 106, such that the seismic source 112 is raised to a position other than the lowered position during movement of the frame assembly 102 between one data acquisition point to subsequent data acquisition point, as shown in FIG. 6. This precludes the possibility of the seismic source system 106a interfering with ground obstacles.

Figure 7:
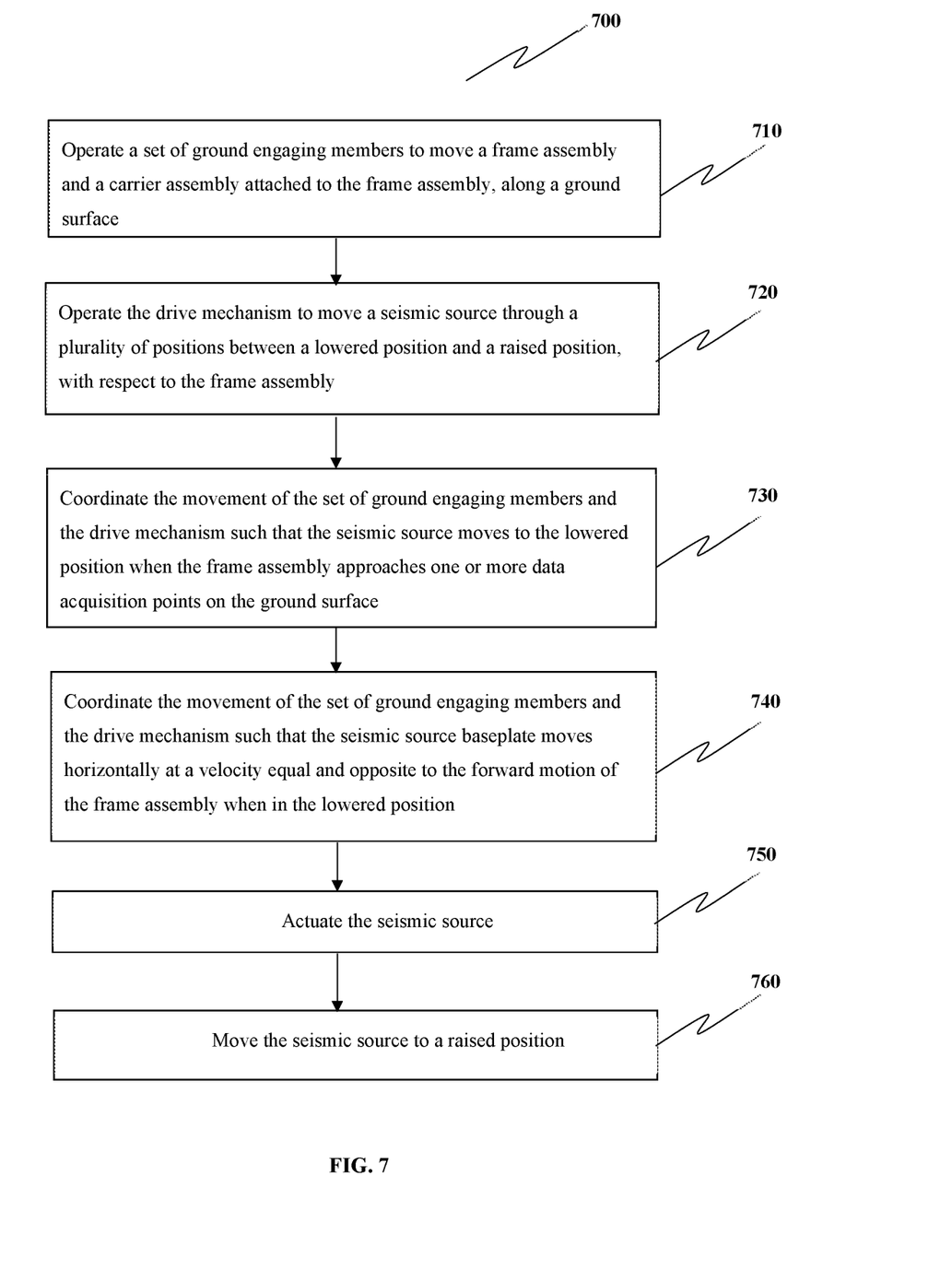
FIG. 7 illustrates a block diagram for a method of acquiring geophysical data, in accordance with an embodiment of the present invention.

The present disclosure also provides a method 700 of acquiring geophysical data, as shown in FIG. 7. The method of acquiring geophysical data may be executed by the geophysical data acquisition system 100 of the present disclosure. However, in an alternative embodiment, the method is not restricted to system 100 and may be performed by any geophysical data acquisition system 100. Further, the sequence or order of various steps shall not limit the method to be performed in such sequence or order, and thus can be in any order, or simultaneously.

The method includes, in step 702, operating a set of ground engaging members 104 to move a frame assembly 102 and a carrier assembly attached to the frame member, along a ground surface. During this step, the system 100 moves towards a data acquisition point and is prepared for actuation. In the next step, 704, the drive mechanism 110 is operated to move a seismic source 112 through a plurality of positions between a lowered position and a raised position, with respect to the frame assembly 102. At step 706, the movement of the set of ground engaging members 104 and the drive mechanism 110 is coordinated such that the seismic source 112 moves to the lowered position when the frame assembly 102 approaches one or more data acquisition points on the ground surface. At step 708, the movement of the set of ground engaging members 104 and the drive mechanism 110 is coordinated such that the seismic source baseplate 108 moves horizontally at a velocity equal and opposite to the forward motion of the frame assembly when in the lowered position. In a subsequent step 710, a hold-down pressure is applied to the baseplate when it is in contact with the data acquisition point, and the seismic source 112 is actuated. In a subsequent step 712, the seismic source is raised from the lowered position.

In light of the foregoing, the present disclosure provides the geophysical data acquisition system 100, the method 700 of acquiring geophysical data, and the system 100 for acquiring seismic data, which offers various advantages. For example, by controlling and coordinating the movement of one or more seismic sources 112 with respect to the frame assembly 102 and the movement of the frame assembly 102 along the ground surface, the geophysical data acquisition system 100 of the present disclosure facilitates improved utilization of time. Further, by moving the seismic sources 112 to the lowered position when the frame assembly 102 approaches one or more data acquisition points on the ground surface, and by allowing the uninterrupted movement of the frame assembly 102 along the ground surface while maintaining the seismic source baseplates 108 stationary with respect to the data acquisition point on the ground surface, the geophysical data acquisition system 100 eliminates the need to keep the frame assembly 102 stationary while imparting seismic energy at a data acquisition point.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enabling others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

What is claimed is:

1. A geophysical data acquisition system comprising:
a frame assembly;
a set of ground engaging members connected to the frame assembly, and adapted to move the frame assembly along the ground surface; and
a carrier assembly attached to the frame assembly, the carrier assembly having one or more seismic source subsystems and a drive mechanism adapted to move each of the one or more seismic source subsystems through a plurality of positions between a lowered position and a raised position, and a forwards position and a rearwards position with respect to the frame assembly and direction of motion of the frame assembly, each of the one or more seismic source subsystems include a seismic source baseplate,
wherein, the movement of each of the one or more seismic source subsystems is in coordination with the movement of the frame assembly, such that each of the one or more seismic source systems move to the lowered position when the frame assembly approaches one or more data acquisition points on the ground surface, whereby with respect to the data acquisition point on the ground surface the movement of the frame assembly is maintained while the seismic source baseplate remain stationary.

2. The geophysical data acquisition system as claimed in claim 1, wherein, a horizontal relative movement of the seismic source baseplates of each of the one or more seismic source subsystems with respect to corresponding data acquisition points on the ground surface is substantially zero, during actuation of the one or more seismic source subsystems.

3. The geophysical data acquisition system as claimed in claim 2, wherein, in the lowered position, the seismic source baseplate is in contact with the data acquisition point on the ground surface applying a hold-down pressure thereon.

4. The geophysical data acquisition system as claimed in claim 3, wherein the hold-down pressure applied by the seismic source baseplate on the data acquisition point is equal to or greater than a recoil force generated upon actuation of the seismic source subsystem.

5. The geophysical data acquisition system as claimed in claim 3 further comprises a control unit in communication with the carrier assembly.

6. The geophysical data acquisition system as claimed in claim 5, wherein the control unit is adapted to store the location and time of actuation associated with each seismic source subsystem.

7. The geophysical data acquisition system as claimed in claim 6, wherein the control unit is adapted to control the movement of one or more of the ground engaging members and the drive mechanism of the carrier assembly, such that the horizontal movement of the seismic source baseplates with respect to the data acquisition points during contact with the ground is zero.

8. The geophysical data acquisition system as claimed in claim 7, wherein the control unit is adapted to actuate one or more of the seismic source subsystems when the seismic source baseplates are in contact with the ground at a data acquisition point.

9. The geophysical data acquisition system as claimed in claim 8, wherein the control unit is adapted to store one or more of timing, location, force, and accelerometer data corresponding to each data acquisition point.

10. The geophysical data acquisition system as claimed in claim 9, wherein the control unit is adapted to control the movement of one or more of the ground engaging members and the carrier assembly, such that during rotation of the ground engaging members in a clockwise direction, the drive mechanism is adapted to rotate the seismic source baseplates also in a clockwise direction, and at a rotational velocity whereby the horizontal movement of the baseplates with respect to an upcoming data acquisition point is zero when the baseplate is in the lowered position.

11. The geophysical data acquisition system as claimed in claim 9, wherein the control unit is adapted to control the movement of one or more of the ground engaging members and the carrier assembly such that during the movement of the frame assembly in the forward direction, at a location proximal to a data acquisition point, the drive mechanism is adapted to move the seismic source baseplates in a direction opposite to the forward direction, whereby the net horizontal movement of the seismic source baseplate with respect to the data acquisition point is zero.

12. The geophysical data acquisition system as claimed in claim 10, wherein the control unit is adapted to control the movement of one or more of the ground engaging members and the carrier assembly, such that the seismic source baseplate is in a position other than the lowered position during movement of the frame assembly between one data acquisition point to subsequent data acquisition point, thereby precluding a possibility of the carrier assembly interfering with ground obstacles.

13. The geophysical data acquisition system as claimed in claim 12, wherein, when the seismic source baseplate is in a position other than the lowered position, the control unit is adapted to prepare the seismic source subsystem for an upcoming data acquisition point.

14. A method of acquiring geophysical data, the method comprising:
    operating a set of ground engaging members to move a frame assembly and a carrier assembly attached to the frame assembly, along a ground surface;
    operating the drive mechanism of the carrier assembly to move a seismic source baseplate through a plurality of positions between a lowered position and a raised position, and a forwards position and a rearwards position with respect to the frame assembly; and
    coordinating the movement of the set of ground engaging members and the carrier assembly such that the seismic source baseplate moves to the lowered position when the frame assembly approaches one or more data acquisition points on the ground surface whereby with respect to the data acquisition point on the ground surface, the movement of the frame assembly is maintained while the seismic source baseplate remains stationary.

15. The method of acquiring geophysical data as claimed in claim 14, wherein a horizontal relative movement of the seismic source baseplate with respect to the data acquisition point on the ground surface is zero.

16. The method of acquiring geophysical data as claimed in claim 14 further comprises,
    actuating the seismic source when the seismic source is in contact with the data acquisition point, applying a hold-down pressure on the data acquisition point when the seismic source is in contact therewith, wherein the hold-down pressure applied by the seismic source on the data acquisition point is equal to or greater than a recoil force generated by the actuation of the seismic source.

17. The method of acquiring geophysical data as claimed in claim 16 further comprises,
    collecting seismic data associated with the data acquisition point using at least one seismic receiver.

18. A system for acquiring seismic data, the system comprising:
    a frame assembly;
    a set of ground engaging members connected to the frame assembly for supporting the frame assembly on a ground surface, the set of ground engaging members being adapted to rotate to enable movement of the frame assembly along a horizontal direction on the ground surface; and
    a carrier assembly attached to the frame assembly, the carrier assembly having one or more seismic source subsystems and a drive mechanism adapted to move each of the one or more seismic source subsystems through a plurality of positions between a lowered position and a raised position, and a forwards position and a rearwards position with respect to the frame assembly and direction of motion of the frame assembly, each of the one or more seismic source subsystems include a seismic source baseplate,
    wherein, the movement of each of the one or more seismic source subsystems is in coordination with the movement of the frame assembly, such that each of the one or more seismic source systems move to the lowered position when the frame assembly approaches one or more data acquisition points on the ground surface, whereby with respect to the data acquisition point on the ground surface the movement of the frame assembly is maintained while the seismic source baseplate remain stationary,
    wherein the seismic source is adapted to be operated when the baseplate is in contact with the data acquisition point.

19. The system for acquiring seismic data as claimed in claim 18, wherein, in the lowered position the baseplate is in contact with the data acquisition point on the ground surface to apply a quantity of pressure thereon.

20. The system for acquiring seismic data as claimed in claim 19 further comprising,
    a control unit in communication with each of the set of ground engaging members and the carrier assembly,
    wherein the control unit is adapted to control the movement of one or more of the set of ground engaging members and the carrier assembly such that during rotation of the set of ground engaging members in a first rotational direction, the drive mechanism is adapted to move the seismic source whereby the net horizontal movement of the seismic source baseplate with respect to an upcoming data acquisition point is zero,
    wherein the control unit is adapted to control the movement of one or more of the set of ground engaging members and the carrier assembly, such that the seismic source is in a raised position during movement of the frame assembly between one data acquisition point to a subsequent data acquisition point, thereby precluding a possibility of the seismic source interfering with ground obstacles.

* * * * *